United States Patent
Baldes et al.

(10) Patent No.: US 8,468,106 B2
(45) Date of Patent: Jun. 18, 2013

(54) METHOD AND DEVICE FOR AUTOMATED PALLETIZING OF PACKAGES TO FORM STABLE STACKS

(75) Inventors: Lars Baldes, Augsburg (DE); Julian Haselmayr, Augsburg (DE); Jesper Boedker Christensen, Aalborg (DK); Gerda Ruge, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 642 days.

(21) Appl. No.: 12/715,437

(22) Filed: Mar. 2, 2010

(65) Prior Publication Data
US 2010/0268675 A1 Oct. 21, 2010

(30) Foreign Application Priority Data
Mar. 2, 2009 (DE) .................. 10 2009 011 287

(51) Int. Cl.
*G06F 15/18* (2006.01)
*G06N 3/00* (2006.01)
*G06N 3/12* (2006.01)

(52) U.S. Cl.
USPC .......................................................... 706/13

(58) Field of Classification Search
USPC ................................................ 706/12, 13, 62
See application file for complete search history.

(56) References Cited

U.S. PATENT DOCUMENTS

| | | | | |
|---|---|---|---|---|
| 5,908,283 | A * | 6/1999 | Huang et al. | 414/801 |
| 6,120,241 | A * | 9/2000 | Huang et al. | 414/801 |
| 6,286,656 | B1 * | 9/2001 | Huang et al. | 198/502.2 |
| 6,290,454 | B1 * | 9/2001 | Huang et al. | 414/799 |
| 6,699,007 | B2 * | 3/2004 | Huang et al. | 414/801 |
| 7,210,894 | B2 * | 5/2007 | Huang et al. | 414/801 |
| 7,266,422 | B1 * | 9/2007 | DeMotte et al. | 700/217 |

FOREIGN PATENT DOCUMENTS
WO WO 2008/083936 7/2008

OTHER PUBLICATIONS
"Stability Aspects of Pallet Loading," Bischoff, OR Spektrum, vol. 13 (1991) pp. 189-197.

* cited by examiner

*Primary Examiner* — Jeffrey A Gaffin
*Assistant Examiner* — Ilya Traktovenko
(74) *Attorney, Agent, or Firm* — Schiff Hardin LLP

(57) ABSTRACT

A method for the automatic palletizing of stable package stacks includes the steps of virtual generation of multiple follow-up configurations by adding packages to at least one initial configuration, assessment of these follow-up configurations, and pursuit of follow-up configurations that are assessed as good as initial configurations. These steps are repeated until a termination criterion is satisfied. The follow-up configurations are assessed on the basis of different partial stack heights, towers and/or overbuildings. Another version of the method includes the steps of virtual generation of a package stack, and determination of a characteristic stability value of a package of a layer of a virtual package stack on the basis of the characteristic stability value of packages on which the package rests.

16 Claims, 2 Drawing Sheets

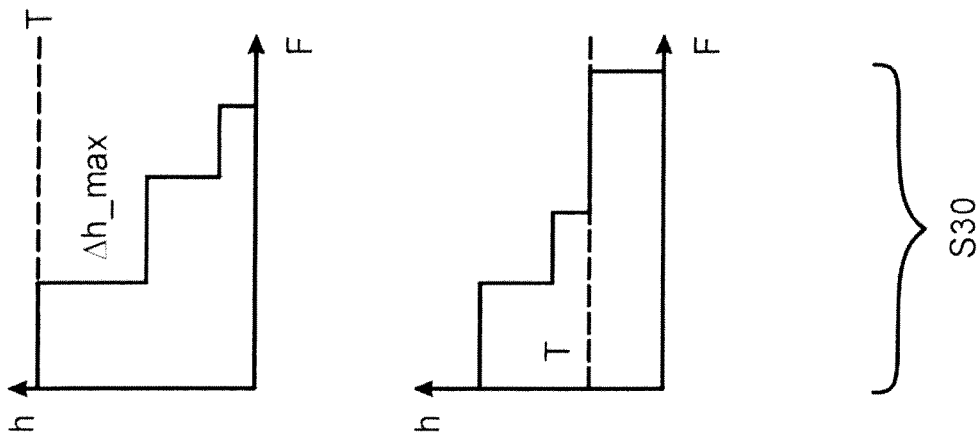
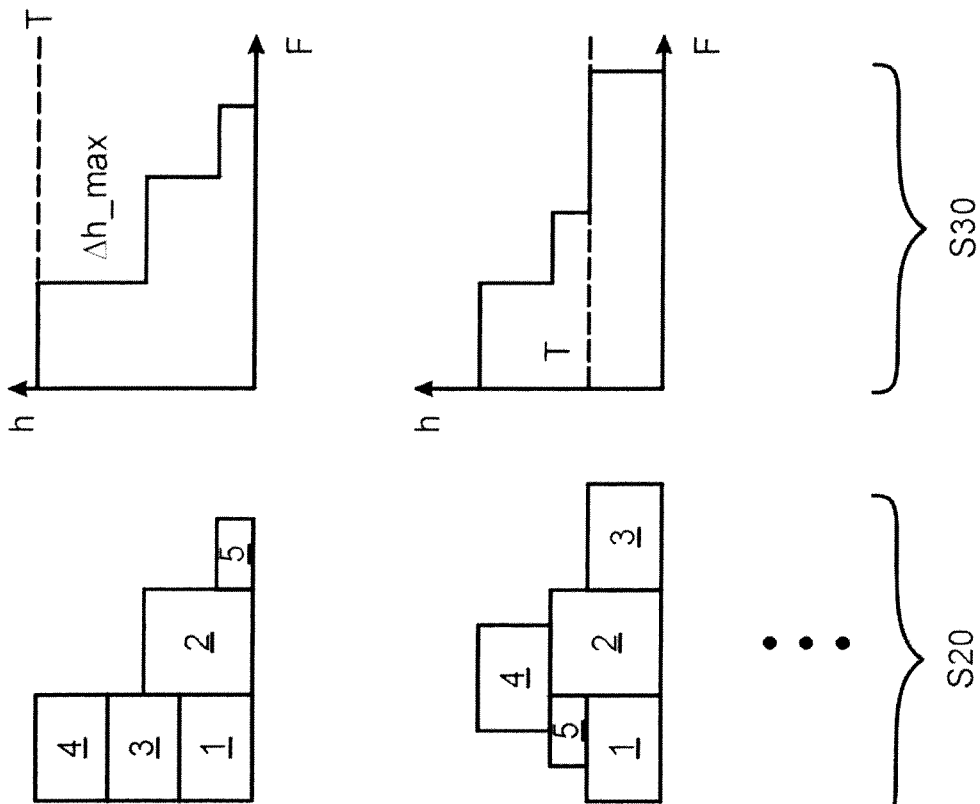
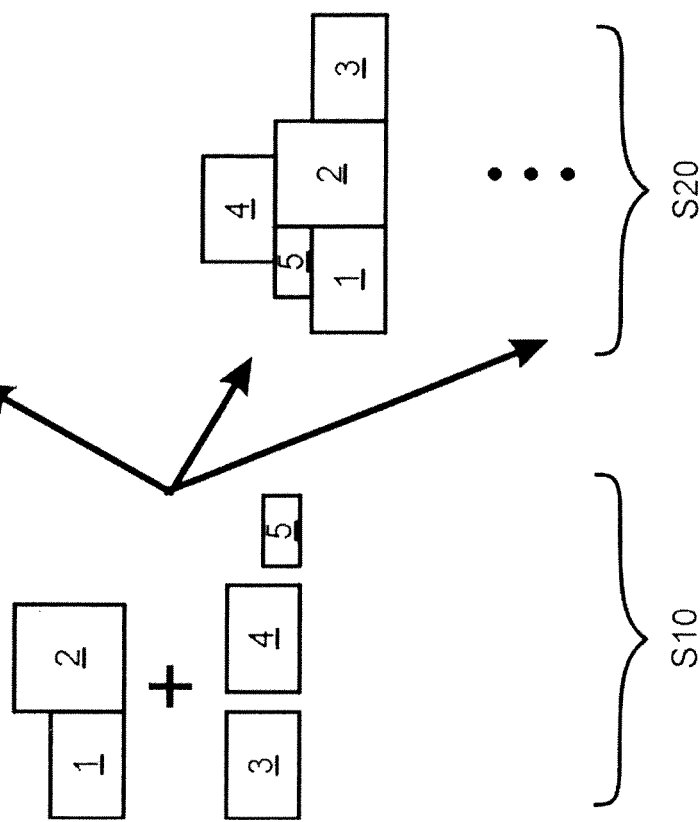

METHOD AND DEVICE FOR AUTOMATED PALLETIZING OF PACKAGES TO FORM STABLE STACKS

BACKGROUND OF THE INVENTION

1. Field of the Invention

The invention concerns a method and a device for automated generation of stable or more stable package stacks, in particular by means of a manipulator.

2. Description of the Prior Art

In manufacturing, for storage, for transport and for consignment, individual goods or goods bundles (that are uniformly designated as packages in the following) are frequently stacked atop one another on loading or transport means such as storage spaces, pallets, shelf boards, continuous transporters or the like in order to save packing space, for example. This is generally designated in the following as palletizing packages into a package stack.

It is desirable for the generated package stack to have a higher stability since such stacks can be handled better, for example can be moved dynamically. The stability of provided (partial) package stacks should therefore be assessed or already be taken into account in the planning of a package stack to be generated, i.e. the generation of a palletizing or loading pattern.

For this purpose, DE 10 2007 001 263 A1 discloses determining characteristic values for the stability, to consider the weight, size center of gravity position, the ratio of footprint to bearing surface, and the position of packages relative to one another. E. E. Bischoff examines and assesses known heuristic methods in "Stability aspects of pallet loading", OR Spektrum (1991) 13:189-197.

SUMMARY OF THE INVENTION

An object of the present invention is to improve the automated palletizing of stable package stacks.

A method according to the invention is particularly suitable for the palletizing of mixed package stacks that contain varying packages with different dimensions. It can advantageously be used to check provided package stacks or to plan package stacks to be generated, and is based on the principle to increase the stability by overbuilding. The supporting of a package on two or more underlying packages is thereby generally designated as overbuilding. In contrast to this, packages that are supported on only a single package are defined as what are known as towers. If all packages of a tower are supported on only the respective underlying package, this is designated as a free tower (in contrast to towers whose uppermost package is supported on adjacent packages).

According to a first aspect of the present invention, a heuristic method is proposed for the automatic palletizing of stable package stacks according to which one or more packages that are still to be palletized are virtually added to an initial configuration, for example a loading means such as a pallet or a partial package stack from a preceding step. In that the package or, respectively, packages are added at different points and/or in different orientations, and/or in that different packages are added to the initial configuration, two or more follow-up configurations are generated.

In contrast to a mere "brute force" method, the follow-up configurations that are generated in this way are evaluated, and only those that are assessed as good are pursued as new initial configuration(s) in following method steps. For example, this can be realized via corresponding evaluation of the fitness of these configurations in an evolutionary optimizer, by excluding from further method steps configurations whose assessment falls below a predetermined, fixed or variable limit value, or by taking the evaluation into account in a quality criterion of an optimizer.

These steps are repeated until a termination criterion is satisfied, for example all packages to be palletized are used, all follow-up configurations are assessed as poor or the like. The variant tree of the follow-up configurations that are pursued as a new initial configuration can advantageously be reduced if necessary during the workflow of the heuristic method, for example in that a subset (in particular the best assessed follow-up configurations that have resulted from all pursued initial configurations) is pursued as a new initial configuration in the order of their assessment.

It is noted that an evaluation, for example, can be discretized by overrunning predetermined quality limit values, in particular a binary classification into good and poor classifications, but can also be made uniform or continuous, in particular with blurring by fuzzification, wherein the positive treatment of a good criterion (for example the pursuit of a good configuration) can also be implemented uniformly by the negative treatment of a complementary poor criterion, for example the non-pursuit of a poor configuration.

According to the invention, the follow-up configurations are evaluated on the basis of different partial stack heights, of towers and/or of overbuildings.

In particular a configuration can be assessed better, for example in that a corresponding characteristic quality value is assigned to it or its existing characteristic quality value is correspondingly increased if it exhibits lower partial stack height differences. For this, the differences between the levels of the uppermost packages of the configuration can be assessed with different standards, for example via absolute or quadratic averaging, a maximum standard or the like. The height differences can advantageously also be mapped in a histogram whose characteristic values can then serve for the assessment as a good or poor configuration.

Additionally or alternatively, a configuration can be evaluated as better if it exhibits lower and/or fewer (in particular free) towers since such towers form potential seeds or sources of instability in the package stack.

Furthermore, a configuration can additionally or alternatively be assessed as better if it exhibits a higher number of overbuildings. An overbuilding can thereby be evaluated on the basis of an (in particular predeterminable) minimum contact area (footprint). For example, an overbuilding is preferably only classified as a development to be considered in the evaluation when the ratio of the area supported on underlying packages to the maximum possible contact area of the resting package exceeds a predetermined, fixed or variable value, for example 15%. All overbuildings can be enumerated as integers, meaning that every overbuilding can be weighted the same, or the overbuildings can be weighted uniformly in the determination of the number, for example corresponding to the relationship explained above.

In order to generate a configuration from an initial layer (for example an empty pallet or a partial stack from a preceding step), it can be advantageous that the preferred or, respectively, higher-priority packages of such a configuration whose height difference falls below a similarity limit value (that thus are advantageously essentially equal in height) are added in parallel (next to one another) since this facilitates the formation of overbuildings in the next step. In particular if such a parallel arrangement is not possible due to the available packages or other boundary conditions (inasmuch lower-priority packages relative to essentially equally high packages), such packages whose height difference exceeds a perturbation limit value can then be arranged in parallel with high priority. The possibility increases to achieve partial stacks of the same height again by the addition of an additional short package to the shorter of the packages arranged in parallel, by the parallel arrangement of packages with significantly different heights.

According to a second aspect of the present invention, in a method for automated palletizing of stable package stacks, a characteristic stability value of a package of a layer of a virtual package stack is determined on the basis of the characteristic stability of values of packages on which the package rests. This characteristic stability value can be used in the heuristic generation (explained in the preceding) of a virtual package stack for the evaluation of follow-up configurations. However, an independent application is also similarly possible in which stability values are propagated from bottom to top through an (in particular virtual) package stack.

This second aspect enables the determination of a characteristic stability value for packages in a simple manner that can be computationally handled well, even in complex, mixed package stacks. For this a stabilization of underlying packages via overlying packages is intentionally disregarded. In a preferred embodiment, this can be iteratively taken into account as well by a subsequent backward propagation from top to bottom, possibly even a repeat forwards-backwards recursion.

The characteristic stability value of a package is preferably determined on the basis of a contact area with packages on which the package rests. This is based on the principle that packages that are supported with more contact area on underlying packages are more stable, such that the stability of the underlying package is propagated to a correspondingly greater degree to the overlying package.

The characteristic stability value of a package can also be comparably determined on the basis of the number of packages on which the package rests, and/or the number of corners with which the packet is seated. This is based on the principle that packages that are supported on multiple underlying packages, just like packages that are seated on more corners, are more stable, such that the stability of the underlying package is propagated to a correspondingly greater degree to the overlying package. In particular, a minimum limit value for underlying packages or supported corners can be provided as of which the characteristic stability value of the underlying packages is propagated identically to the overlying package. This minimum limit value can, for example, correspond to the number of lower corners of the seated package (thus 4 given packages with rectangular footprint).

The characteristic stability value of a package is preferably determined as a weighted sum of the characteristic stability values of packages on which the package rests. This is based on the principle that underlying packages on which a package is supported contribute to different degrees to the stability of the overlying package, such that the stability of the underlying packages is correspondingly propagated differently to the overlying package.

In an advantageous embodiment that is simple to implement, to determine the characteristic stability value of a package of a layer of a virtual package stack the characteristic stability values of the packages on which the package rests can be assigned a constant value (for example "1") so that the characteristic stability value of an overlying package results on the basis of its contact areas with packages on which this package rests.

BRIEF DESCRIPTION OF THE DRAWINGS

FIG. 1 shows an initial configuration in a step of a method according to one embodiment of the present invention.

FIG. 2 shows two follow-up configurations in a step of the method.

FIG. 3 shows height histograms and tower heights of the follow-up configurations of FIG. 2.

DESCRIPTION OF THE PREFERRED EMBODIMENTS

Figure 4A:
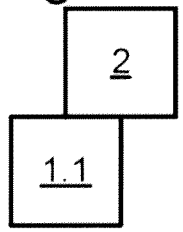
FIGS. 4A, 4B are side and plan views of a metastable package stack.

The sequence of FIG. 1→FIG. 2→FIG. 3 shows a loop of a heuristic method according to the first aspect of the present invention for the successive generation of a virtual stable package stack.

In an initial Step S10, one or more initial configurations are selected. In FIG. 1 an initial configuration in the form of two packages 1, 2 of different heights standing next to one another is provided that, for example, resulted from a preceding loop or was provided by the user.

The packages 3, 4, 5 that are still to be palletized are added to this initial configuration in Step S20. In that the packages are added in different arrangements and/or orientations, multiple follow-up configurations are thus generated, of which two are shown in FIG. 2. It is recognizable in the very schematic example that the lower configuration in FIG. 2 (in which the packages 5, 2 are overbuilt by the package 4) is markedly more stable than the upper configuration with the high free tower composed of packages 1, 3 and 4.

The generated follow-up configurations are now evaluated in Step S30. For this the height T of the highest free tower (1+3+4 at the top in FIG. 2; or 5 at the bottom in FIG. 2) of the respective configuration is considered, which is drawn with a dash-dot line in FIG. 3 for the respective adjacent configuration.

Moreover, the partial stack heights h that are mapped in the histograms of FIG. 3 over the stack contact area F are considered. In these it is shown in particular that a larger maximum difference $\Delta h\_max$ between partial heights (namely between the height of the stack 1+3+4 and the package 2) occurs in the upper configuration in FIG. 2.

It is also taken into account that an overbuilding (a package overlapping multiple stacks) above the entire contact area of the package 4 is present in the lower configuration in FIG. 2, while no overbuilding is present in the upper configuration.

Under suitable quantification of these three criteria $\Delta h\_max$, T and overbuilding, the configuration below in FIG. 2 is assessed as good, the configuration above in FIG. 2 as not good or, respectively, poor. Therefore only the lower configuration that is assessed as good is pursued and forms the basis of a new initial configuration if the loop FIG. 1→FIG. 2→FIG. 3 is run through again analogously to generate additional layers on the package stack 1+2+3+4+5; in contrast, the configuration above in FIG. 2 is discarded.

Figure 4B:
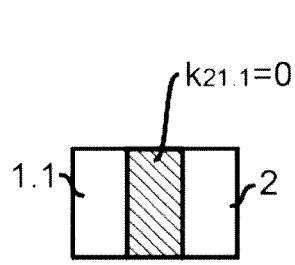

FIG. 4A shows in side view a package stack made up of two packages 1.1, 2 stacked one atop the other. In particular in the plan view from above in FIG. 4B, the footprint or contact area (drawn there with hatching) between two packages is well recognizable; it amounts to 50% of the maximum contact area or underside area of the package 2. This stair-like construction is metastable since, given a homogeneous mass distribution of the package 2, its center of gravity lies directly over the edge of the package 1.1 supporting it.

Figure 5A:
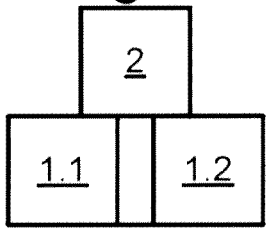
FIGS. 5A, 5B are side and plan views of a more stable package stack.
Figure 5B:
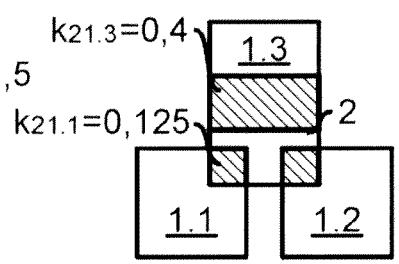

FIGS. 5A, 5B show (in a presentation corresponding to FIG. 4A, 4B) a more advantageous, more stable configuration in which the upper package 2 is supported with 40% of its underside on a package 1.3 and a respective eighth on the packages 1.1, 1.2.

Figure 6A:
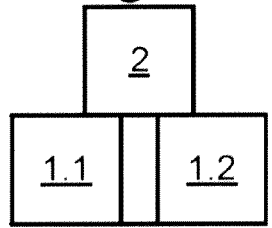
FIGS. 6A, 6B are side and plan views of an even more stable package stack.
Figure 6B:
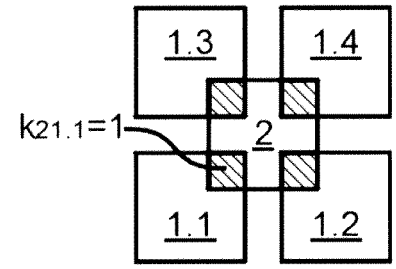

Finally, FIGS. 6A, 6B show in the same depiction an even more advantageous, even more stable configuration in which the upper package 2 is supported at each of its four corners with a respective eighth of its underside on the packages 1.1, . . . , 1.4.

Figure 7:
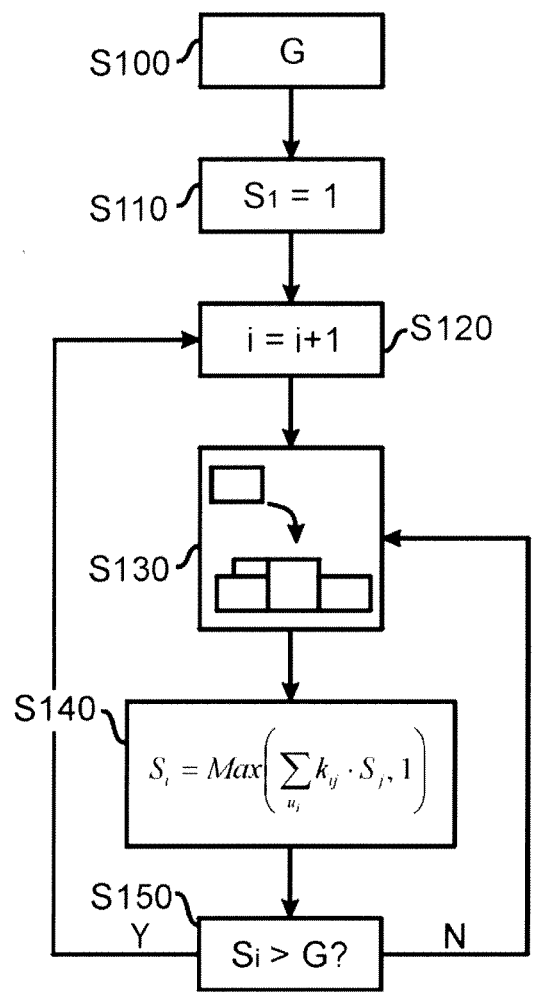
FIG. 7 shows the workflow of a method according to a further embodiment of the present invention.

FIG. 7 shows the workflow of a method according to the second aspect of the present invention in order to map this simply (in terms of calculation) in the evaluation of the stability of the package stack, and thus for example to be able to evaluate a package stack or a configuration.

For this a limit value for the assessment of the stability is initially established in Step S100 that is advantageously greater than 0.5 and, in the exemplary embodiment, is 0.65. A characteristic stability value $S_1$ for the packages of a lowermost layer that, for example, can be defined by a pallet on which the packages are stacked or by the underlying packages 1.1, . . . , 1.4 shown in FIG. 4 through 6 can then be provided in Step S110. In the exemplary embodiment, this value is equal to 1 and represents maximum stability of a package.

In the virtual package stack, a characteristic stability value $S_i$ for the packages of the stack is now propagated from bottom to top. For this a counter i that designates the package to be assessed is incremented in Step S120, and this package is arranged in Step S130 at a predetermined point of the virtual package stack. If the package stack is predetermined, such that only its stability should be assessed, Step 130 degenerates into the establishment of where and how the package i is arranged in the package stack. If the virtual package stack should only be generated under consideration of the stability, an optimizer can arrange the package at various points for testing in Step S130.

In Step S140 the characteristic stability value $S_i$ for the package i is now determined according to $$S_i = \text{Max}\left(\sum_{u_i} k_{ij} \cdot S_j, 1\right) \quad (1)$$

with:
the quantity $u_i$ of the packages underlying the package i, i.e. the packages on which the package i is seated,
the function $$\text{Max}(a, 1) = \begin{cases} a \Leftrightarrow a \leq 1; \\ 1 \Leftrightarrow a > 1; \end{cases}$$

and
the weighting factor $k_{ij}$. This corresponds to the ratio of the contact area between the package i and the underlying package j to the maximum footprint of the package i insofar as the package i does not rest on at least four packages and/or with at least 4 corners on packages, meaning that the stability of the underlying packages is propagated to the overlying package proportional to the contact area. In contrast to this, in the event that the package i rests on at least four packages or, respectively, with at least 4 corners on packages, the factor $k_{ij}=1$, meaning that the stability of the underlying packages is propagated entirely to the overlying package.

For simplification, in (1) the same uniformly constant value (for example "1") can also always be used for the characteristic stability value $S_j$ of the underlying package j, independent of a characteristic stability value calculated in a previous method step. The weighting factor $k_{ij}$ can also always correspond to the ratio of the contact area between the package i and the underlying package j to the maximum footprint of the package i, independent of the number of packages and/or corners on or, respectively, with which it is supported.

In Step S150 the characteristic stability value $S_i$ of the package is now compared with the limit value G predetermined in Step S100: if the characteristic stability value falls below the limit value (S150: "N"), the package stack is discarded or the package i is arranged at another point and/or in another orientation and is reassessed. Contrarily, if the characteristic stability value exceeds the limit value (S150: "Y"), the method continues with the next package i+1 in order to thus propagate the characteristic stability value upward, starting from the predetermined characteristic stability value $S_1$ for the pallet or the lowermost layer 1.1, . . . , 1.4.

In the examples of FIG. 4 through 6, an insufficient characteristic stability value consequently results for the configuration of FIG. 4 with $$S_{2,Fig.4} = \text{Max}\left(0,5 \cdot \frac{1}{k_{21,1}} \cdot \frac{1}{s_{1.1}}, 1\right) = 0,5 < \underbrace{0,65}_{G}(a) \quad (a)$$

a quite sufficient characteristic stability value results with $$S_{2,Fig.5} = \text{Max}\left(0,125 \cdot \frac{1}{k_{21,1}} \cdot \frac{1}{s_{1.1}} + 0,125 \cdot \frac{1}{k_{21,2}} \cdot \frac{1}{s_{1.2}} + 0,4 \cdot \frac{1}{k_{21,3}} \cdot \frac{1}{s_{1.3}}, 1\right) = 0,65 = G \quad (b)$$

for the configuration of FIG. 5, and the best characteristic stability value results for the configuration of FIG. 6 (in which the package 2 is supported with its four corners on the four packages 1.1, . . . , 1.4) with $$N_{underlying\ packages} = \quad (c)$$

$$N_{supported\ corners} = 4 \Rightarrow k_{1.1} = k_{1.2} = k_{1.3} = k_{1.4} \to 1$$

$$S_{2,Fig.6} = \text{Max}\left(\sum_{j=1}^{4} \frac{1}{k_{21,j}} \cdot \frac{1}{s_{1,j}}, 1\right) = \text{Max}(4, 1) = 1 > G$$

in spite of its lower contact area $$\sum_{j=1}^{4} \frac{0,125}{k_{21,j}} = 0,5.$$

Although modifications and changes may be suggested by those skilled in the art, it is the intention of the inventor to embody within the patent warranted hereon all changes and modifications as reasonably and properly come within the scope of his contribution to the art.

We claim as our invention:
1. A method for automated palletizing packages to form stable package stacks, comprising the steps of:

in a processor, determining an initial configuration of packages to be stacked, and virtually generating said initial configuration in said processor;

in said processor, virtually generating a plurality of follow-up configurations that each add multiple packages to said initial configuration;

in said processor, automatically assessing each of said follow-up configurations with respect to at least one stability criterion selected from the group consisting of differences between respective heights of said adjacent uppermost packages, occurrences of towers formed by a package supported only by one directly underlying package, and occurrences of overbuildings formed by a package being supported by at least two directly underlying packages, to identify a follow-up configuration among said plurality of follow-up configurations that best satisfies said stability criterion;

making a representation of said best of said follow-up configurations available at an output of the processor in a form for guiding stacking of said packages in said stack; and repeatedly virtually generating and assessing said follow-up configurations in said processor until a termination criterion is satisfied.

2. A method as claimed in claim 1 comprising, when using said differences between respective heights of adjacent uppermost packages as said stability criterion, assessing a respective follow-up configuration as being better than other follow-up configurations that exhibits smaller height differences among said uppermost packages than in said other follow-up configurations.

3. A method as claimed in claim 1 comprising, when employing said occurrences of towers as said stability criterion, assessing a respective follow-up configuration as being better than other follow-up configurations that exhibits a fewer number of said towers.

4. A method as claimed in claim 3 comprising assessing a respective follow-up configuration as being better than other follow-up configurations that exhibits a fewer number of free towers in which all packages in that tower are exclusively supported only by the packages in that tower.

5. A method as claimed in claim 1 comprising, when employing said occurrences of overbuildings as said stability criterion, assessing a respective follow-up configuration as better than other follow-up configurations that exhibits a higher number of said overbuildings.

6. A method as claimed in claim 5 comprising identifying an overbuilding as occurring when a package overlies a package therebelow with a predetermined minimum overlapping area.

7. A method as claimed in claim 1 comprising virtually generating said plurality of follow-up configurations according to a preferential hierarchy that includes a primary preference and a secondary preference that is lower in said hierarchy than said primary preference and, when using said difference in height between adjacent uppermost packages as said stability criterion, virtually generating said plurality of follow-up configurations to produce, as said primary preference, a height difference between adjacent uppermost packages that is below a similarity threshold and, as said secondary preference, to produce a height difference between said adjacent uppermost packages that exceeds a perturbation threshold that would preclude another package from being stably stacked on said adjacent uppermost packages.

8. A method as claimed in claim 1 wherein each of said follow-up configurations comprises a virtual stack of packages that at least partially respectively overlie one another and, when using said occurrence of overbuildings as said stability criterion, assessing each of said follow-up configurations by determining a characteristic stability value of a package under assessment in said virtual stack based on respective characteristic stability values of packages in said virtual package stack that are beneath said package under assessment, and a contact area between said package under assessment and any package in said virtual package stack immediately beneath said package under assessment.

9. A method as claimed in claim 8 comprising, in said processor, determining each characteristic stability value of said package under assessment as a sum of respective characteristic stability values of all other packages in said virtual stack on which said package under assessment rests.

10. A method as claimed in claim 8 comprising determining the characteristic stability value for said package under assessment as a value selected from the group consisting of a number of packages on which the package under assessment rests, and a number of corners of the package under assessment that are supported by other packages in said virtual stack.

11. A method as claimed in claim 8 comprising, in said processor, determining the respective stability value for said package under assessment as a sum of respective characteristic stability values of packages on which the package under assessment respectively weighting rests, and said respective characteristic stability values dependent on at least one of a contact area of said package under assessment with said packages on which said package under assessment rests, and a number of corners of said package under assessment that are supported by said packages on which said package under assessment rests.

12. A method as claimed in claim 8 comprising assessing said virtual package stack, in said processor, as being unstable if said virtual package stack contains a package having a characteristic stability value that is below a predetermined unit value.

13. A method as claimed in claim 8 comprising determining said characteristic stability value of said package under assessment as the respective stability value of any package immediately beneath said package under assessment multiplied by a weighting factor, and assigning said respective characteristic stability value to any of said packages that are directly beneath said package under assessment in said virtual stack.

14. A method as claimed in claim 13 comprising assigning said constant value as a constant uniform value for all packages that are directly beneath said package under assessment in said virtual package stack.

15. A method as claimed in claim 1 comprising, in said processor, automatically assessing each of said follow-up configurations with respect to each stability criterion in said group.

16. A non-transitory computer-readable storage medium encoded with programming instructions and being loaded into a computerized control unit of an automated loading system, said programming instructions causing said computerized control unit to:

determine an initial configuration of packages to be stacked, and virtually generating said initial configuration in said processor;

virtually generate a plurality of follow-up configurations that each add multiple packages to said initial configuration;

automatically assess each of said follow-up configurations with respect to at least one stability criterion selected from the group consisting of differences between respective heights of adjacent uppermost packages, occurrences of towers formed by a package supported only by one directly underlying package, and occurrences of overbuildings formed by a package being supported by at least two directly underlying packages, to identify a follow-up configuration among said plurality of follow-up configurations that best satisfies said stability criterion;

make a representation of said best of said follow-up configurations available at an output of the control unit in a form for guiding stacking of said packages in said stack; and repeatedly virtually generating and assessing said follow-up configurations until a termination criterion is satisfied.

* * * * *